(12) United States Patent
Vakili

(10) Patent No.: US 10,956,737 B1
(45) Date of Patent: *Mar. 23, 2021

(54) SYSTEM AND APPARATUS FOR IMPROVED EYE TRACKING USING A MOBILE DEVICE

(71) Applicant: Wells Fargo Bank, N.A., San Francisco, CA (US)

(72) Inventor: Masoud Vakili, Los Altos, CA (US)

(73) Assignee: WELLS FARGO BANK, N.A., San Franciso, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,931

(22) Filed: Aug. 9, 2019

Related U.S. Application Data

(63) Continuation-in-part of application No. 15/791,651, filed on Oct. 24, 2017, now Pat. No. 10,402,644.

(51) Int. Cl.
*G06K 9/00* (2006.01)
*G06K 9/46* (2006.01)

(52) U.S. Cl.
CPC ..... *G06K 9/00617* (2013.01); *G06K 9/00604* (2013.01); *G06K 9/4661* (2013.01)

(58) Field of Classification Search
None
See application file for complete search history.

(56) References Cited

U.S. PATENT DOCUMENTS

| 10,402,644 | B1* | 9/2019 | Vakili | G06K 9/00986 |
| 2004/0005083 | A1* | 1/2004 | Fujimura | A61B 3/113 |
| | | | | 382/103 |
| 2008/0284980 | A1* | 11/2008 | Skogo | G06T 7/20 |
| | | | | 351/210 |
| 2009/0174865 | A1* | 7/2009 | Privitera | A61B 3/0025 |
| | | | | 351/246 |
| 2012/0050516 | A1* | 3/2012 | Tsukizawa | G06K 9/00604 |
| | | | | 348/78 |
| 2014/0354514 | A1* | 12/2014 | Aronsson | G06F 3/013 |
| | | | | 345/7 |
| 2015/0009334 | A1* | 1/2015 | Kwon | H04N 5/332 |
| | | | | 348/164 |

(Continued)

OTHER PUBLICATIONS

U.S. Appl. No. 15/791,651, filed Oct. 24, 2017, U.S. Pat. No. 10,402,644, issued.

(Continued)

*Primary Examiner* — Delomia L Gilliard
(74) *Attorney, Agent, or Firm* — Alston & Bird LLP

(57) ABSTRACT

Embodiments are disclosed for using an apparatus to perform pupil identification. An example method includes measuring, by a light sensor of the apparatus, an ambient infrared light level. The example method further includes determining whether the measured ambient infrared light level exceeds a threshold level. The example method further includes performing pupil identification on a user based on the determination of whether the measured ambient infrared light level exceeds the threshold level. In this regard, the example method involves performing bright pupil identification in an instance in which the measured ambient infrared light level exceeds the threshold level, and performing dark pupil identification if not. Corresponding apparatuses and non-transitory computer readable storage media are also provided.

21 Claims, 6 Drawing Sheets

(56) References Cited

U.S. PATENT DOCUMENTS

| | | | |
|---|---|---|---|
| 2015/0085097 A1* | 3/2015 | Larsen | H04N 5/2351 |
| | | | 348/78 |
| 2016/0299354 A1* | 10/2016 | Shtukater | G02C 7/04 |
| 2016/0307038 A1* | 10/2016 | Skogo | G06F 21/316 |
| 2017/0255814 A1* | 9/2017 | Kaehler | G06K 9/00617 |

OTHER PUBLICATIONS

"Dark and Bright Pupil Tracking." [retrieved Nov. 29, 2017]. Retrieved from the Internet: <URL: https://www.tobiipro.com/learn-and-support/learn/eye-tracking-essentials/what-is-dark-and-bright-pupil-tracking/>. (dated 2017); 3 pages.

"Eyes are the Prize: Evaluating the benefits of eye-tracking equipment I UX Magazine." [retrieved Nov. 29, 2017]. Retrieved from the Internet: <URL: http://uxmag.com/articles/eyes-are-the-prize>. (dated Jul. 31, 2012); 8 pages.

"File:Solar Spectrum.pug" [retrieved Nov. 29, 2017] Retrieved via the Internet Archive Wayback Machine at: <URL: https://web.archive.org/web/20170501040431/https://upload.wikimedia.org/wikipedia/commons/4/4c/Solar_Spectmm.png>. (dated Jun. 11, 2017); 4 pages.

"How Does Eye Tracking Work?" [retrieved Nov. 29, 2017] Retrieved from the Internet: <URL: http://sensics.com/eye-tracking-work/>. (dated Jun. 11, 2017); 4 pages.

De Lemos, Jakob et al. "Measuring emotions using eye tracking." Proceedings of Measuring Behavior 2008; Maastricht, The Netherlands, Aug. 26-29, 2008, 1 page.

Jacques, Thomas. "EyesOn Mobile Eye Tracking." Carnegie Mellon University, School of Computer Science Senior Thesis, published 2010, 30 pages.

\* cited by examiner

What is your Ethnicity?

○ Caucasian

○ Hispanic

○ Asian

○ African

[ Submit ] — 602

SYSTEM AND APPARATUS FOR IMPROVED EYE TRACKING USING A MOBILE DEVICE

CROSS-REFERENCE TO RELATED APPLICATIONS

This non-provisional application is a continuation of U.S. patent application Ser. No. 15/791,651, filed Oct. 24, 2017, and entitled "SYSTEM AND APPARATUS FOR IMPROVED EYE TRACKING USING A MOBILE DEVICE," the entirety of which is incorporated herein by reference.

TECHNOLOGICAL FIELD

Example embodiments of the present invention relate generally to eye tracking and, more particularly, to eye tracking using a mobile device.

BACKGROUND

The inventor has discovered problems with existing mechanisms for eye tracking. Through applied effort, ingenuity, and innovation, the inventor has solved many of these identified problems by developing solutions embodied by the present invention and described in detail below.

BRIEF SUMMARY

Eye tracking systems have many useful applications in a wide array of industries. As one example, eye tracking systems can be used as active tools in new types of human-machine interfaces responsive to human eye movement. As another example, eye tracking systems can be used passively to enhance the understanding of human behavior in various situations where gaze analysis can provide insight into human thought processes. Eye tracking technology thus has potential to modify and/or inform how we perform a wide range of activities in the future. In this regard, the benefits of eye tracking technology are likely to be particularly valuable when the tracking can be performed by a mobile device, which can enable eye tracking to be performed in changing real-world environments.

However, the inventor has identified problems with existing eye tracking systems that prevent the wider utilization of existing eye tracking systems. First, existing eye tracking systems do not intelligently utilize both dark pupil identification and bright pupil identification methods. These identification methods are effective in different environmental conditions, and thus the inventor has determined that the effectiveness of eye tracking systems can be improved by intelligently toggling between these underlying pupil identification methods. Some systems employ only a single pupil identification method, but not two. Other systems employ multiple pupil identification methods, but do so in all scenarios, or select from among different pupil identification methods on an ad hoc basis or in response to performance of complex evaluations of the quality of the output of each pupil identification method. A need therefore exists for a system that efficiently toggles between dark pupil identification and bright pupil identification processes to maximize eye tracking accuracy while reducing the resource cost of deciding when to switch identification methods.

Moreover, existing eye tracking systems do not employ smartphones or tablet devices. Instead, existing eye tracking systems typically comprise peripheral devices that connect to a desktop or laptop computer, or comprise special-purpose eyewear (e.g., virtual reality headsets or specially designed glasses). But reliance on peripheral devices prevents mobility of an eye tracking system, and thus forecloses many potentially useful applications of eye tracking technology. And wearable technology alienates a large segment of the consumer base that is be unwilling to purchase yet another type of device. Accordingly, a need exists for an eye tracking system that improves the likelihood of consumer adoption of eye tracking technology.

Finally, existing eye tracking systems require special-purpose equipment to perform both dark pupil identification and bright pupil identification. But regardless of how effective an eye tracking system might be, it cannot be realistically deployed to the mass market unless the equipment it relies upon itself is commonly available. Accordingly, a need exists for an eye tracking system that functions using mobile device technology that is both available and ubiquitous today.

Example embodiments described herein provide solutions to these problems, as well as others. In one example embodiment, a method is provided for an eye tracking system to efficiently toggle between pupil identification methods. In another example embodiment not mutually exclusive of the first, an apparatus is configured for pupil identification while also having a form factor and functionality similar to that of the smartphone or tablet devices currently utilized by consumers today. And in yet another example embodiment not mutually exclusive of the first or second, an apparatus for pupil identification may comprise an existing smartphone or tablet device that is modified by software to provide eye tracking functionality that historically has required special-purpose equipment.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

FIG. 6 illustrates an example user interface that may be presented to a user in accordance with some example embodiments described herein.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

Figure 1A:
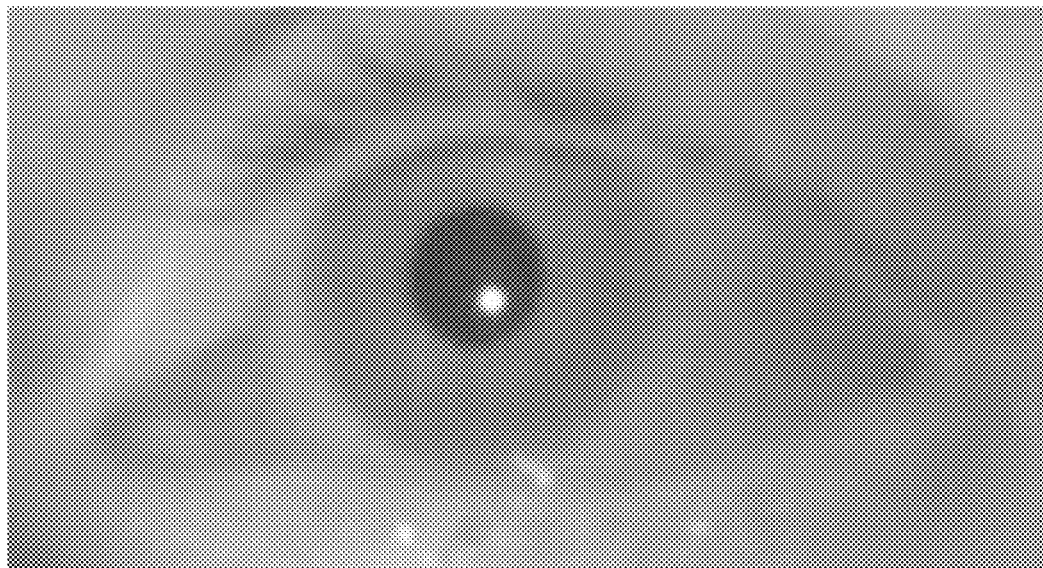
FIGS. 1A and 1B comprise respective photographs of pupils undergoing bright pupil identification and dark pupil identification processes, respectively.
Figure 1B:
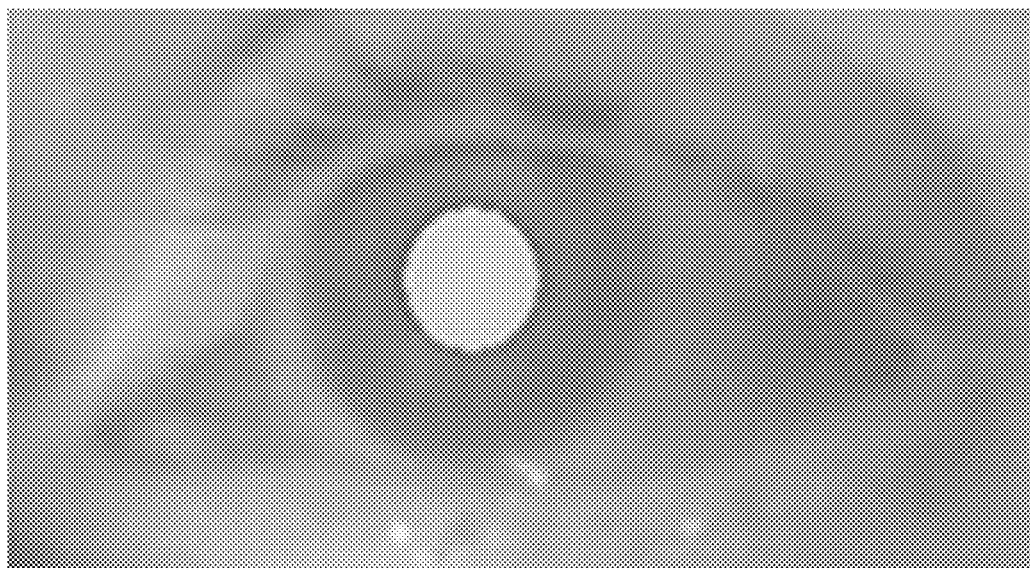

As noted above, methods, apparatuses, and systems are described herein that provide solutions to the problems identified above, as well as others. In one example embodiment, an eye tracking system is provided that can efficiently toggle between bright and dark pupil identification methods. As shown in FIG. 1A, bright pupil identification comprises a pupil identification method in which a light source is disposed in a physically close proximity to a camera that detects reflection of the light from a user's pupil. The reflected light creates an effect similar to the red-eye effect commonly experienced during regular photography. In contrast, dark pupil identification comprises a pupil identification method in which a light source is disposed farther away from the camera, and while the reflected light from the farther-out light source is used for pupil identification, the underlying mechanism by which the identification is performed is different. Accordingly, example embodiments thus enable efficient toggling between these distinct pupil identification methods in order to provide an enhanced pupil identification method, apparatus, and system.

In another example embodiment not mutually exclusive of the first, an apparatus is configured for pupil identification while also having a form factor and functionality similar to that of the smartphone or tablet devices currently utilized by consumers today. And in yet another example embodiment not mutually exclusive of the first or second, an existing smartphone or tablet device is configured to enable performance of pupil identification and, in turn, provide eye tracking functionality that historically has required special-purpose equipment.

Greater detail is provided below regarding certain example embodiments contemplated herein.

Device Architecture

Apparatuses of the present invention may be embodied by any of a variety of devices. For example, the apparatus performing improved pupil identification may include any of a variety of fixed terminals, such a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection with example apparatus 200.

Figure 2:
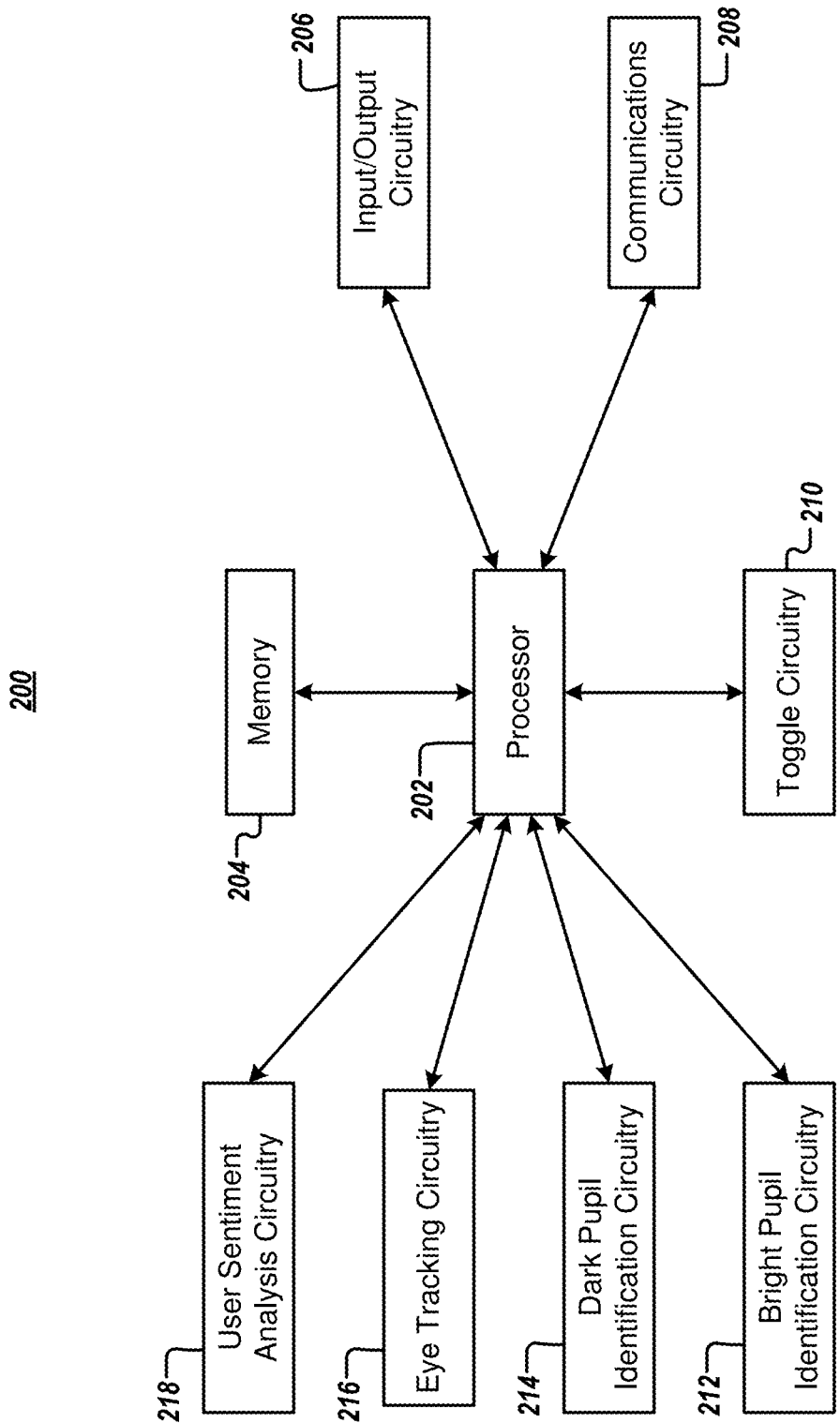
FIG. 2 illustrates a schematic diagram of the components of an example apparatus that may perform operations described herein, in accordance with some example embodiments described herein.

As illustrated in FIG. 2, the apparatus 200 may include a processor 202, a memory 204, input/output circuitry 206, and communications circuitry 208. Moreover, apparatus 200 may include toggle circuitry 210, bright pupil identification circuitry 212, dark pupil identification circuitry 214, eye tracking circuitry 216, and in some embodiments, sentiment analysis circuitry 218. The apparatus 200 may be configured to execute the operations described below in connection with FIG. 5. Although these components 202-218 are described in some cases using functional language, it should be understood that the particular implementations necessarily include the use of particular hardware. It should also be understood that certain of these components 202-218 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein with respect to components of the apparatus therefore includes particular hardware configured to perform the functions associated with respective circuitry described herein.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the apparatus 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The apparatus 200 further includes input/output circuitry 206 that may, in turn, be in communication with processor 202 to provide output to the user and to receive input from a user or another source. In this regard, the input/output circuitry may comprise a camera configured to capture images and/or detect infrared light reflected from a user's eye. The input/output circuitry may further comprise a separate light sensor that is configured to detect light levels in the environment and which may be disposed in the apparatus 200 on the same surface as a camera. The light sensor may in this regard be an infrared light sensor. Separately, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of display through computer program instructions (e.g., software and/or firmware) stored on a memory accessible to the processor (e.g., memory 204, and/or the like), such as to cause blocks of the display to emit light at selected wavelengths.

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 300 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Toggle circuitry 210 includes hardware components designed to determine whether a measured ambient infrared light level exceeds a threshold level. These hardware components may, for instance, utilize elements of input/output circuitry 206 to detect ambient infrared light levels, and memory 204 to retrieve a stored value of the threshold level. Toggle circuitry 210 may utilize processing circuitry, such as the processor 202, to perform the above operations, and may utilize memory 204 to store collected information.

Bright pupil identification circuitry 212 includes hardware components designed to perform a bright pupil identification process in an instance in which the measured ambient infrared light level exceeds a threshold level. These hardware components may, for instance, utilize elements of input/output circuitry 206 to detect ambient infrared light levels, and memory 204 to retrieve a stored value of the threshold level. Bright pupil identification circuitry 212 may utilize processing circuitry, such as the processor 202, to perform its corresponding operations, and may utilize memory 204 to store collected information.

Dark pupil identification circuitry 212 includes hardware components designed to perform a dark pupil identification process in an instance in which the measured ambient infrared light level does not exceed the threshold level. These hardware components may, for instance, utilize elements of input/output circuitry 206 to detect ambient infrared light levels, and memory 204 to retrieve a stored value of the threshold level. Bright pupil identification circuitry 212 may utilize processing circuitry, such as the processor 202, to perform its corresponding operations, and may utilize memory 204 to store collected information.

Eye tracking circuitry 216 includes hardware components designed to track eye movements of a user. These hardware components may, for instance, utilize bright pupil identification circuitry 212 or dark pupil identification circuitry 214 to perform underlying pupil identification facilitating the eye tracking functionality. Eye tracking circuitry 216 may utilize processing circuitry, such as the processor 202, to perform the above operations, and may utilize memory 204 to store collected information.

Finally, sentiment analysis circuitry 218 includes hardware components designed to performing user sentiment analysis based on a historical record of the user's eye movements captured. These hardware components may, for instance, utilize elements eye tracking circuitry 216 to capture the eye movements used for sentiment analysis. Sentiment analysis circuitry 218 may utilize processing circuitry, such as the processor 202, to perform the above operations, and may utilize memory 204 to store collected information.

It should also be appreciated that, in some embodiments, the toggle circuitry 210, bright pupil identification circuitry 212, dark pupil identification circuitry 214, eye tracking circuitry 216, or sentiment analysis circuitry 218 may include a separate processor, specially configured field programmable gate array (FPGA), or application specific interface circuit (ASIC) to perform its corresponding functions.

In addition, computer program instructions and/or other type of code may be loaded onto a computer, processor or other programmable apparatus's circuitry to produce a machine, such that the computer, processor other programmable circuitry that execute the code on the machine create the means for implementing the various functions, including those described in connection with the components of apparatus 200.

Figure 3:
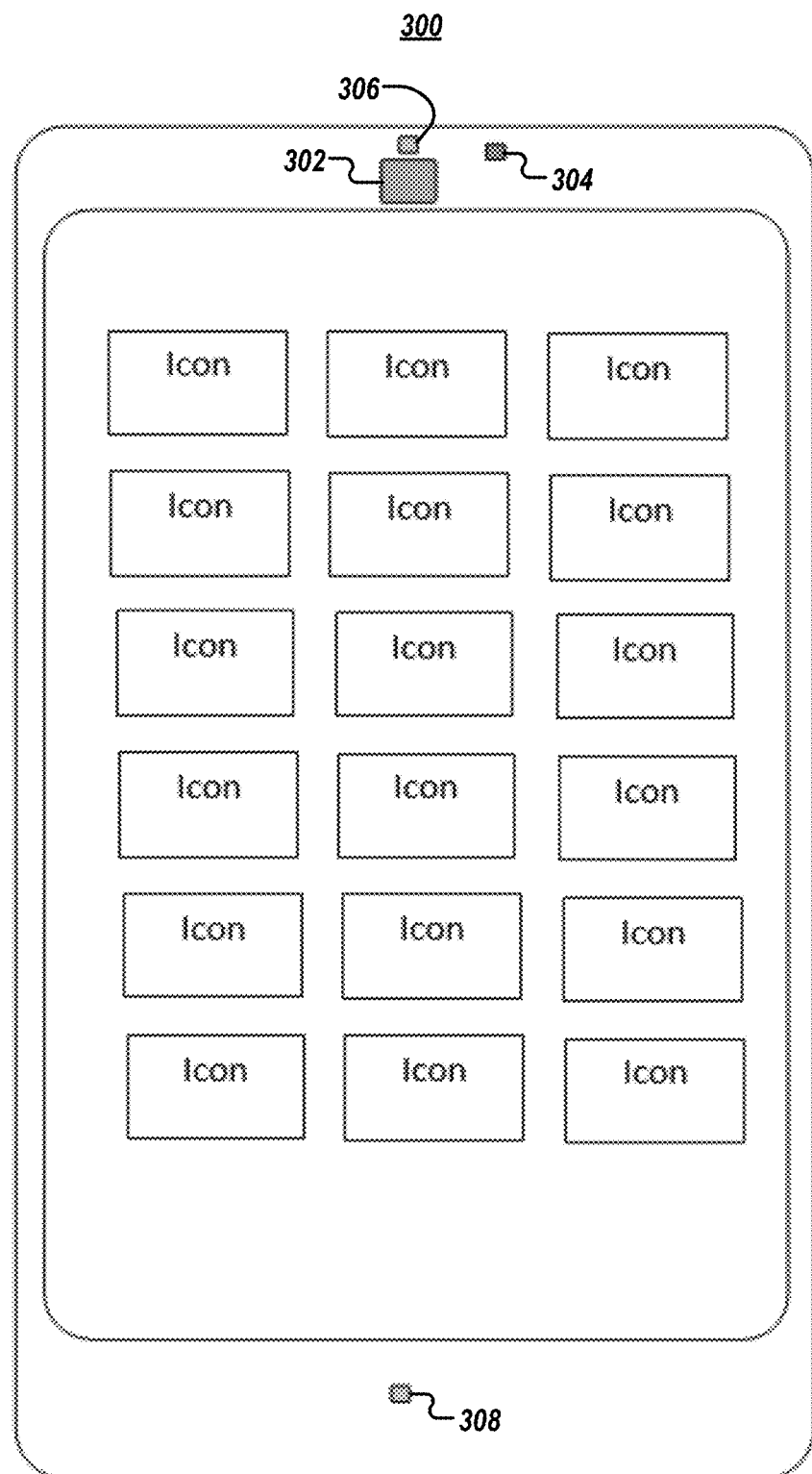
FIG. 3 illustrates a schematic block diagram of an example mobile device that may perform certain operations described herein.

Turning now to FIG. 3, an example apparatus 300 is shown that may embody the components described above in connection with FIG. 2. As shown, apparatus 300 comprises a mobile device, and may embody a smartphone or tablet device of a kind similar to those known today. However, unlike traditional smartphones or tablet devices, apparatus 300 includes additional components enabling it to perform additional eye tracking functionality in addition to the varied existing uses of mobile devices of this nature. In relevant part, apparatus 300 includes a camera 302 and additionally includes an infrared light sensor 304 configured to measure a level of ambient infrared light radiating on the front face of the apparatus 300. In addition, the apparatus 300 include a first illumination source 306 and a second illumination source 308. The first illumination source 306 and the camera 302 are disposed on the same face of the apparatus 300. And as can be seen from FIG. 3, the first illumination source 306 is disposed in close proximity to the camera 302. By virtue of its close proximity to the camera 302, the detected reflection of light emitted from the first illumination source 306 creates an effect similar to the red-eye effect often experienced in regular photography. In contrast, the second illumination source 308, although disposed on the same face of the apparatus 300 as the camera 302, is disposed at a location on the face of the apparatus 300 that is physically distant from the camera 302. Introducing this physical gap provides a wide angle of reflection of any infrared light reflected from the second illumination source, to a user's eye, and to the camera 302. As one example, the typical person carries their smartphone about 40 cm away from their face, so when the apparatus 300 comprises a smartphone, because the second illumination source 308 is at an opposite end of the front face of the smartphone, there is a roughly 30 degree angle of reflection of light reaching the camera 302.

Figure 4:
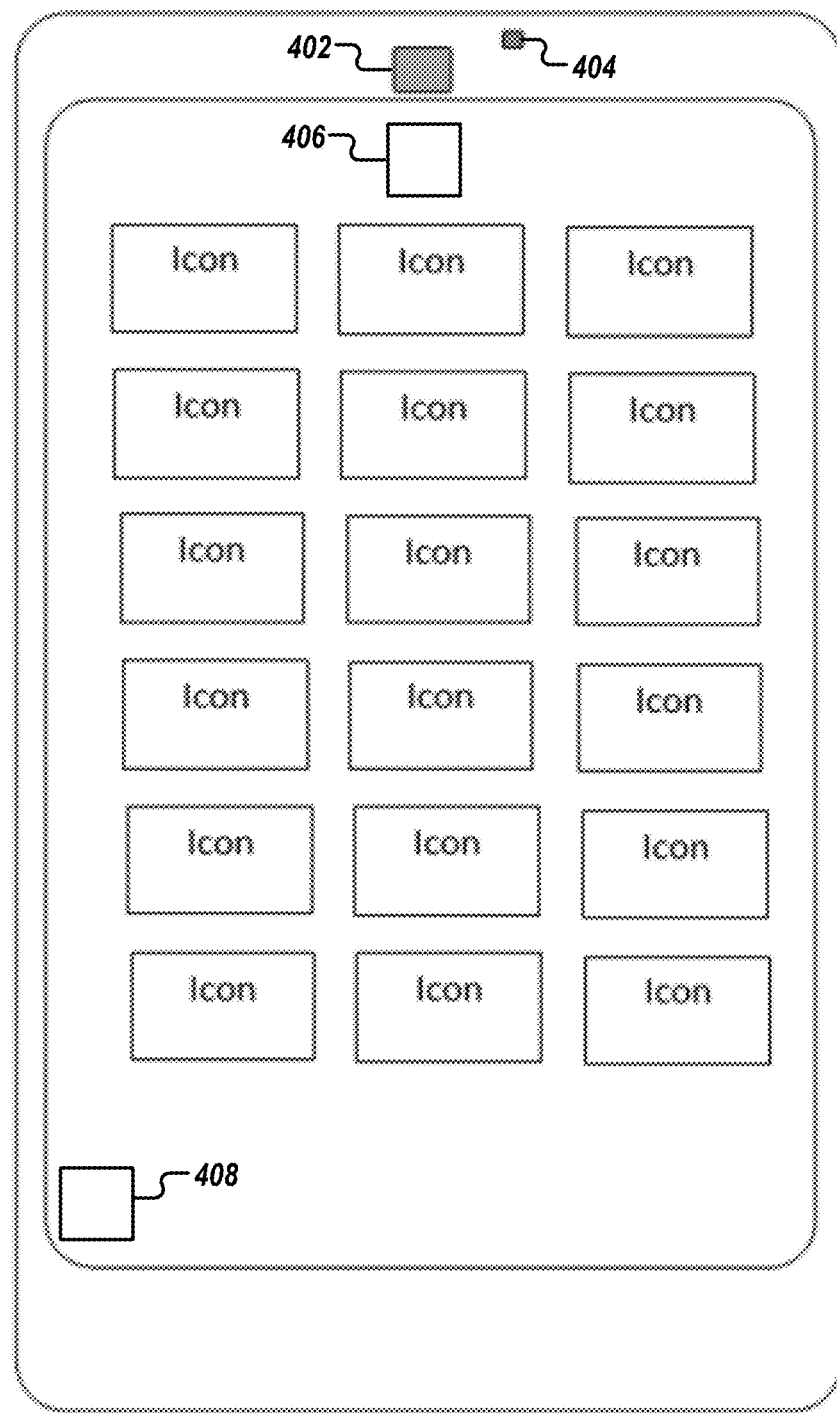
FIG. 4 illustrates a schematic block diagram of another example mobile device that may perform certain operations described herein.

FIG. 4 illustrates another example apparatus 400 that may embody the components described above in connection with FIG. 2. In contrast to apparatus 300, however, apparatus 400 may comprise any of a wide range of apparatuses that exist in the market today, and does not describe external physical changes to those apparatuses. Instead, apparatus 400 describes a similar physical device but which has had a fundamental improvement to its functioning provided by way of software unlocking new capabilities heretofore non-existent in the device. As shown in FIG. 3, the apparatus 400 illustrated in FIG. 4 includes a camera 402, and an infrared light sensor 404 of a similar nature and kind as those described in connection with FIG. 3. But instead of physical illumination sources 306 and 308, the first illumination source 406 of apparatus 400 is a block of pixels nearby the camera 402. The apparatus 400 causes the first illumination source 406 (i.e., the block of pixels) to emit light at a wavelength as close to the infrared spectrum as possible based on the technical design of the screen of the apparatus 400, which may vary based upon which device is loaded with the software functionality described herein. This light may comprise far-red, near-infrared, or even pure infrared light in some embodiments. Accordingly, apparatus 400 is capable of performing bright pupil identification without a dedicated illumination source such as first illumination source 306. In some embodiments, the components housed within the aperture of the camera 402 may include infrared emitting capability, and embodiments of apparatus 400 with this capability may utilize that infrared emitting capability as the first illumination source 406. In similar fashion, the second illumination source 408 of apparatus 400 comprises a block of pixels located away from the camera element of the apparatus, as further shown in FIG. 4, thus obviating the need for a dedicated illumination source such as second illumination source 308 that is provided in apparatus 300.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Having described specific components of example apparatuses 200, 300, and 400 in connection with FIGS. 2-4, an example procedure is described below in connection with FIGS. 5 and 6 for improved pupil identification using both bright and/or dark pupil identification processes.

Example Operations for Enhanced Pupil Identification

Figure 5:
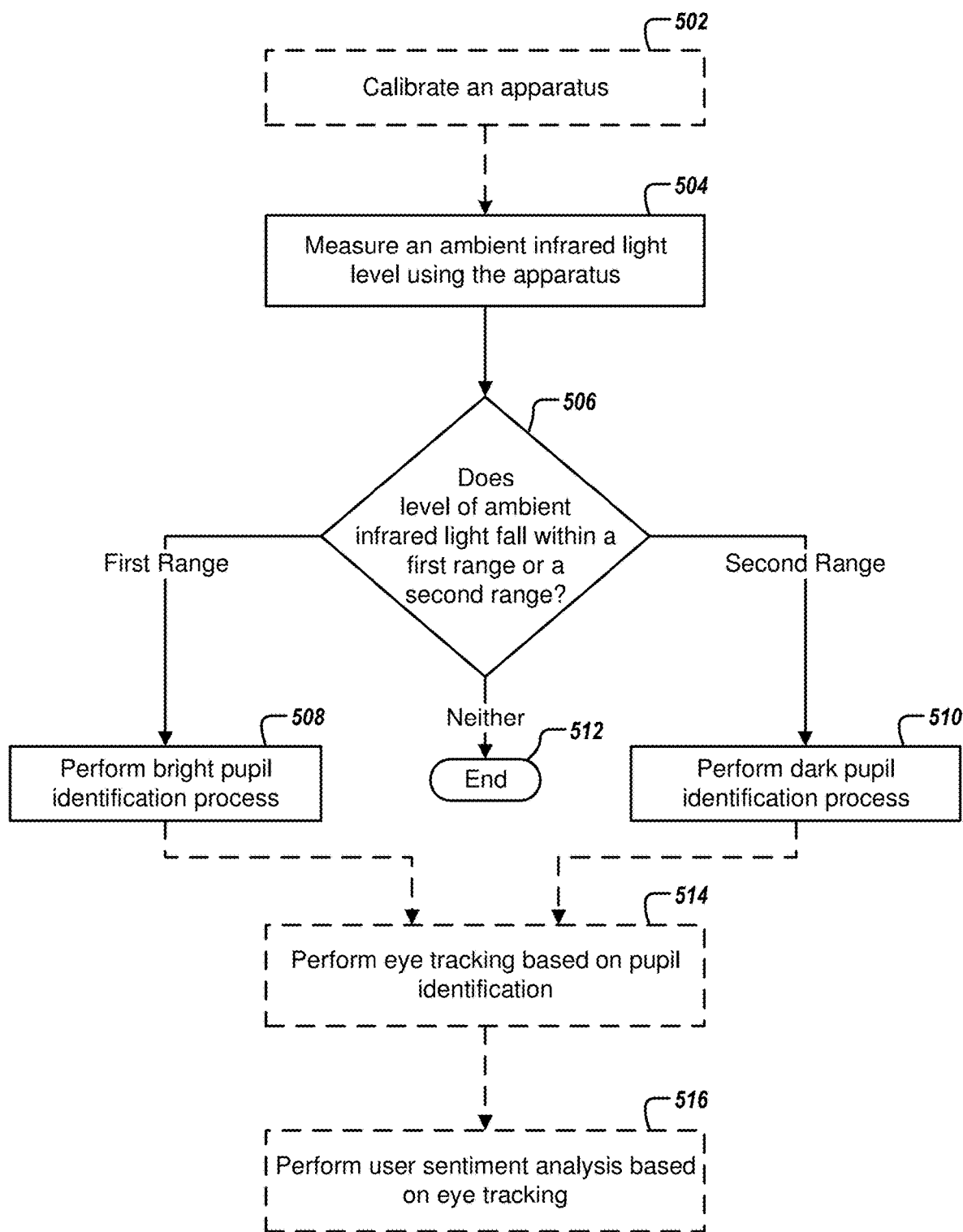
FIG. 5 illustrates a flowchart describing example operations performed by an apparatus in accordance with some example embodiments described herein.

Turning to FIG. 5, a flowchart is illustrated that contain operations for using an apparatus to perform pupil identification in a more efficient and effective manner than has been provided by existing technologies. The operations illustrated in FIG. 5 may, for example, be performed by an apparatus 300 or 400, as described above. And in this regard, the apparatus 200 illustrates example components included in either of apparatuses 300 or 400 in various embodiments, such that the operations described herein may be performed by or through the use of one or more of processor 202, memory 204, input/output circuitry 206, communications circuitry 208, toggle circuitry 210, bright pupil identification circuitry 212, dark pupil identification circuitry 214, eye tracking circuitry 216, and/or sentiment analysis circuitry 218.

Operation 502, the first operation in the procedure illustrated in FIG. 5, is optionally performed in some embodiments but not all. When performed, the apparatus 300 includes means, such as processor 202, memory 204, input/output circuitry 206, communications circuitry 208, toggle circuitry 210, bright pupil identification circuitry 212, dark pupil identification circuitry 214, and/or the like, for calibrating the apparatus for the user to identify a threshold level above which bright pupil identification will be used, and at or below which dark pupil identification will be used. This operation is optional because calibration is only one way of identifying an appropriate threshold level to demarcate appropriate uses of bright and dark pupil identification methods. When performed, this calibration operation typically occurs prior to the remaining operations described below, although in other embodiments it may be performed sporadically as a means of enhancing the beneficial effect of the toggling operations described herein by improving the selection of an appropriate threshold level for toggling between pupil identification methods.

As noted above, calibration of the threshold level is designed to identify the threshold level of ambient infrared light that maximizes overall performance of pupil identification for a particular individual. In this regard, dark pupil identification is more effective than bright pupil identification given lower levels of ambient infrared light (e.g., below about 5% of the ambient infrared light provided by sunlight at sea level at the Sun's zenith and for a mean Earth-Sun separation), while bright pupil identification is more effective than dark pupil identification at higher levels of ambient infrared light (e.g., above 20% of the ambient infrared light provided by sunlight at sea level at the Sun's zenith and for a mean Earth-Sun separation). However, within these two ranges, the effectiveness of dark versus bright pupil identification techniques can vary based on additional factors. For instance, dark pupil identification is generally a more accurate pupil identification method for people of Asian or African origin, while bright pupil identification is generally a more accurate pupil identification method for people of Caucasian or Hispanic origin. Accordingly, the threshold value that maximizes effectiveness of pupil identification in fluctuating light environments will be generally fall somewhere within the 5% and 20% figures noted above.

Calibration of this threshold level prior to performance of the additional operations illustrated in FIG. 5 thus provides a mechanism to optimize the effectiveness of these operations. Calibration of the threshold level may be performed using the apparatus 200 as follows.

First, the apparatus 200 may include means, such as an infrared light sensor disposed on a surface of the apparatus, for measuring an ambient infrared light level. The apparatus 200 may include means, such as input/output circuitry 206, for instructing a user to look at a specific point on the apparatus. Subsequently, the apparatus 200 may include means, such as bright pupil identification circuitry 212 for performing bright pupil identification process using a first illumination source. With prior knowledge of the specific point on the apparatus at which the user is looking, the apparatus 200 may include means, such as processor 202 or the like, for determining an accuracy of the pupil identification process performed using the bright pupil identification circuitry 212. Thereafter, the apparatus 200 may include means, such as dark pupil identification circuitry 214 for performing pupil identification process using a second illumination source. Of course, in some embodiments, dark pupil identification may be performed prior to performance of bright pupil identification. With prior knowledge of the specific point on the apparatus at which the user is looking, the apparatus 200 may include means, such as processor 202 or the like, for determining an accuracy of the pupil identification process performed using the dark pupil identification circuitry 214. Finally, the apparatus 200 may include means, such as processor 202 or the like, for determining a relative accuracy of the bright pupil identification process and the dark pupil identification process for the individual and given the ambient infrared light level measured during the training period.

However, performing this calibration process a single time may illustrate only that at a given level of ambient infrared light, either dark or bright pupil identification is more accurate for the individual. Accordingly, the calibration operation may be repeated a number of times and in a number of environmental lighting conditions, to identify an ideal inflection point above which bright pupil identification is generally more effective for the individual and below which dark pupil identification is generally more effective for the individual. Because environmental lighting conditions are not controlled by the apparatus 200, it may be the case that this calibration operation cannot be repeated at a single point in time. Accordingly, in some embodiments, the apparatus 200 may include means, such as computer instructions stored on memory 204, which cause the apparatus 200 to prompt the user to perform a calibration operation at various times. For instance, in some embodiments, the apparatus 200 may simply prompt the user periodically to perform additional calibration operations. As another example, however, in some embodiments the infrared light sensor of the apparatus may be instructed by the apparatus 200 to periodically measure an ambient infrared light level, and upon measuring an ambient infrared light level that diverges from ambient light levels used in prior calibration operations, the apparatus 200 may prompt the user to perform another calibration operation to enhance the ability of the apparatus 200 to identify an optimal threshold level for pupil identification.

If operation 502 is performed in a given circumstance, the procedure illustrated in FIG. 5 then advances to operation 504, although if operation 502 is not performed, then the procedure may simply begin at operation 504. Either way, at operation 504, the apparatus 200 includes means, such as input/output circuitry 206 or the like, for measuring an ambient infrared light level. In this regard, input/output circuitry 206 may most commonly comprise a light sensor. The light sensor may be an infrared light sensor as known in the art, and may, for instance, comprise one or more passive infrared sensors (e.g., pyroelectric devices). There may be a single light sensing component, or there may be multiple light sensing components disposed at various locations around the apparatus 200 that provides more information regarding the ambient infrared radiation received by the apparatus 200.

Turning next to operation 506, the apparatus 200 includes means, such as toggle circuitry 210 or the like, for determining whether to perform a dark pupil identification process or a bright pupil identification process. In this regard, the toggle circuitry 210 is configured to make this determination based on the measured ambient infrared light level. For instance, the bright pupil identification process may be associated with a first range of ambient infrared radiation, while the dark pupil identification process may be associated with a second range of ambient infrared radiation. Accordingly, in an instance in which the measure ambient infrared light level falls within the first range, the procedure advances to operation 508 for performance of bright pupil identification. However, in an instance in which the measured ambient infrared light level falls within the second range, the procedure advances to operation 510 for performance of dark pupil identification.

In some embodiments, the first range and the second range are separated by a predetermined threshold level, such that a level of ambient infrared radiation below or equal to the predetermined threshold level falls within the first range, while a level of ambient infrared radiation over the predetermined threshold level falls within the second range. This threshold level may have been predetermined using a calibration procedure described in connection with operation 502. Alternatively, the threshold level may be preset by a manufacturer at a default level within the range of 5% to 20% of the ambient infrared light provided by sunlight at sea level at the Sun's zenith and for a mean Earth-Sun separation. In still further embodiments, the threshold level may be manually selected and adjusted by a user via a user interface presented by the apparatus 200. For instance, the user interface 600 illustrated in FIG. 6 may be used to determine an ethnicity of the user, and upon selection of appropriate radio buttons and selection of a "Submit" button 602, the received ethnicity identification information selected by a user may be used by the apparatus 200 to adjust the default threshold value up or down based on generalized knowledge of the efficacy of dark and bright pupil identification methods on people of different ethnicities.

In some embodiments, the first range does not directly abut the second range, and in such embodiments, there will be some intermediate levels of ambient infrared radiation that would not fall within either the first range or the second range (indicating that such levels of ambient infrared radiation are not suitable for either the dark pupil identification process or the bright pupil identification process). In such embodiments, rather than a single threshold level, there may be a first threshold level below which the bright pupil identification process is not suitable, and a second threshold level above which the dark pupil identification process is not suitable. The determination of these first and second threshold levels may be made during a calibration procedure similar to that described above, or may be preset, manually selected, and/or manually adjusted, in similar fashion as described above for situations where only a single threshold level is present. Finally, there may be a level of ambient infrared radiation above which even the bright pupil identification process would not be accurate, and in such embodiments, the first range may be bounded on the high side by a third threshold level above which the bright pupil identification process is not accurate. In embodiments where certain levels of ambient infrared light do not fall within either the first range or the second range, there will be levels of measured ambient infrared light for which the toggle circuitry 210 may thus determine that the apparatus 200 is unable to perform pupil identification by either mechanism, because the measured ambient infrared light level falls outside of either the first range or the second range. In such circumstances, the procedure advances to (and ends) at operation 512.

Turning next to operations 508 and 510, it will be understood that the functionality described in connection with those operations may be referred to generally herein as being performed by pupil identification circuitry of the apparatus 200. Discussion of pupil identification circuitry of the apparatus 200 at this level of breadth is meant to illustrate that various embodiments described herein are configured for performing pupil identification on the user based on the determination made by toggle circuitry 210, in contrast to exiting techniques for pupil identification which are not designed to operate in response to decision-making premised on measured ambient infrared light levels. At a more granular level, however, the pupil identification circuitry of apparatus 200 may comprise bright pupil identification circuitry 212 and dark pupil identification circuitry 214.

As shown at operation 508, the apparatus 200 includes means, such as bright pupil identification circuitry 212, for performing a bright pupil identification process in an instance in which the measured ambient infrared light level falls within the first range identified above. And as shown by operation 510, the apparatus 200 includes means, such as dark pupil identification circuitry 214, for performing a dark pupil identification process in an instance in which the measured ambient infrared light level falls within the second range identified above.

For the bright pupil identification process, the bright pupil identification circuitry 212 causes the first illumination source to emit light, and causes input/output circuitry 206 (which uses a camera, in most cases) to detect received infrared light. As noted previously in discussing apparatus 300, the first illumination source and the camera (or other component of the input/output circuitry 206 designed for detecting infrared light) are disposed on the same general face of the apparatus (which for a smartphone, would be the front of the smartphone), so that when the face of the apparatus is pointed towards a user's eye, the input/output circuitry 206 will receive infrared light reflected by the user's eye. The first illumination source, in this regard, is disposed in close proximity to the camera or other component of the input/output circuitry 206 designed for detecting reflected infrared light. By virtue of its close proximity to the camera (or other component), the detected reflection of the emitted light creates an effect similar to the red-eye effect often experienced in regular photography. The bright pupil identification circuitry 212 deduces a position, size, and orientation of the user's pupil by virtue of its different reflecting properties from other parts of the user' eye and face.

For the dark pupil identification process, the dark pupil identification circuitry 214 causes the second illumination source to emit light, and causes input/output circuitry 206 (which uses a camera, in most cases) to detect received infrared light. The second illumination source and the camera (or other component of the input/output circuitry 206 designed for detecting infrared light) are disposed on the same general face of the apparatus (which for a smartphone, would be the front of the smartphone), so that when the face of the apparatus is pointed towards a user's eye, the input/output circuitry 206 will receive infrared light reflected by the user's eye. But unlike the first illumination source, the second illumination source is disposed at a location on the face of the apparatus that is physically distant from the camera or other component of the input/output circuitry 206 designed for detecting reflected infrared light. Introducing this physical gap provides a wide angle of reflection of any infrared light reflected by the eye. As one example, the typical person carries their smartphone about 40 cm away from their face, so when the second illumination source is at an opposite end of the front face of the smartphone, there is a roughly 30 degree angle of reflection of light reaching the camera or other component of the input/output circuitry 206 designed for detecting the reflected infrared light. Moreover, even if one holds the phone at twice this distance, the resulting 15 degree angle of reflection remains adequate for dark pupil identification. Accordingly, in contrast to a bright pupil identification process, the dark pupil identification circuitry 214 relies on an analysis of different characteristics of the reflected light to deduce a position, size, and orientation of the user's pupil by virtue of its different reflecting properties from other parts of the user' eye and face, as will be understood by those familiar with existing eye tracking systems.

As described above in connection with FIGS. 3 and 4, the first and second illumination sources can take multiple forms. As shown in FIG. 3, the first illumination source may be a dedicated infrared illuminator. But as shown in FIG. 4, the first illumination source may instead be a block of pixels nearby the camera element of a smartphone or table device. In such embodiments, the apparatus 200 may cause the first illumination source (i.e., the block of pixels) to emit light at a wavelength as close to the infrared spectrum as possible based on the technical design of the screen of the apparatus. This light may comprise far-red or near-infra-red, or even pure infrared light, depending on the physical capabilities of the display components of the apparatus itself. Accordingly, a mobile device such as a smartphone or a tablet device may be capable of performing bright pupil identification by including within it an infrared light sensor in close physical proximity to the camera aperture, or an existing device may be rendered capable of performing bright pupil identification by using a nearby blocks of pixels instead of a separate dedicated illumination element. Finally, in some embodiments, the components housed within the aperture of many smartphone and tablet devices may include infrared emitting capability, in which case this capability may separately be harnessed to operate as the first illumination source in some embodiments, without requiring the existence of a separate dedicated illumination element. In similar fashion, the second illumination source may be a dedicated infrared illuminator as shown in FIG. 3, or it may be a block of pixels located away from the camera element of the apparatus, as shown in FIG. 4.

Regardless of whether a dark or bright pupil identification process is used in any given circumstance and regardless of the type of illumination source used to perform the corresponding pupil identification operation, the results of pupil identification from operations 508 or 510 may subsequently be used in operation 514.

As illustrated at operation 514, the apparatus 300 includes means, such as eye tracking circuitry 216, or the like, for tracking eye movements of a user. To do this, eye tracking circuitry 216 may extrapolate a gaze direction and distance of a user's eye from the known position, size, and orientation of the pupil in a manner that will be understood by those familiar with existing eye tracking technologies. It will be understood that operation 514 will frequently follow performance of pupil identification in operations 508 or 510, but it is not necessary in every embodiment contemplated here.

And finally, in circumstances where optional operation 516 is invoked, the apparatus 300 includes means, such as sentiment analysis circuitry 218, or the like, for performing user sentiment analysis based on a historical record of the user's eye movements captured in operation 514. It will be understood that operation 516 is optional, because eye tracking may be used for many purposes, and only some of them will be focused on the sentiment of the user.

As described herein, example embodiments thus provide many benefits to eye tracking systems that have heretofore gone unrealized. Example embodiments described herein provide an eye tracking system configured to efficiently toggle between pupil identification methods in an efficient yet accurate manner. In addition, some example embodiments utilize an apparatus configured for pupil identification that has a form factor and functionality similar to that of the smartphone or tablet devices currently utilized by consumers today. And finally, some example embodiments contemplate the modification of existing smartphone or tablet devices to perform pupil identification that has heretofore been impossible without special-purpose equipment.

FIG. 5 thus illustrates a flowchart describing the operation of apparatuses, methods, and computer program products according to example embodiments contemplated herein. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an apparatus 200 and executed by a processor 202 of the apparatus 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for performing pupil identification, the apparatus comprising:
    toggling circuitry configured to determine, based on measured ambient infrared light level exceeding a first threshold or failing to meet a second threshold, whether to perform pupil identification using one of either the dark pupil identification process or the bright pupil identification process; and
    pupil identification circuitry configured to perform pupil identification on a user using the bright identification process upon the determination that the measured ambient infrared light level exceeds the first threshold and to perform dark pupil identification process upon the determination that the measured ambient infrared light level fails to meet the second threshold.

2. The apparatus of claim 1, further comprising:
    a light sensor configured to measure an ambient infrared light level.

3. The apparatus of claim 1,
    wherein the pupil identification circuitry comprises dark pupil identification circuitry and bright pupil identification circuitry,
    wherein the bright pupil identification circuitry is configured to perform the bright pupil identification process using a first illumination source of the apparatus, and
    wherein the dark pupil identification circuitry is configured to perform the dark pupil identification process using a second illumination source of the apparatus.

4. The apparatus of claim 3, wherein the first illumination source or the second illumination source comprises an infrared illuminator.

5. The apparatus of claim 3, wherein the first illumination source or the second illumination source comprises a block of pixels on a face of the apparatus.

6. The apparatus of claim 1, wherein the first threshold level comprises a particular level of ambient infrared light within a range of 5% to 20% of a level of radiant infrared light produced by sunlight at the Sun's zenith and for a mean Earth-Sun separation.

7. The apparatus of claim 1, further comprising:
eye tracking circuitry configured to track one or more eyes of the particular user based on performing the pupil identification; and
sentiment analysis circuitry configured to analyze a sentiment of the user based on the tracking of the one or more eyes of the user.

8. A method for using an apparatus to perform pupil identification on a user, the method comprising:
determining, by toggling circuitry of the apparatus, based on a measured ambient infrared light level exceeding a first threshold or failing to meet a second threshold, whether to perform pupil identification using one of either the dark pupil identification process or the bright pupil identification process; and
performing pupil identification on the user using the dark pupil identification process upon the determination that the measured ambient infrared light level fails to meet the second threshold; and
performing pupil identification on the user using the bright pupil identification process upon the determination that the measured ambient infrared light level exceeds the first threshold.

9. The method of claim 8, further comprising:
measuring, by a light sensor of the apparatus, an ambient infrared light level.

10. The method of claim 8,
wherein the pupil identification circuitry comprises dark pupil identification circuitry and bright pupil identification circuitry,
wherein the bright pupil identification circuitry is configured to perform the bright pupil identification process using a first illumination source of the apparatus, and
wherein the dark pupil identification circuitry is configured to perform the dark pupil identification process using a second illumination source of the apparatus.

11. The method of claim 10, wherein the first illumination source or the second illumination source comprises an infrared illuminator.

12. The method of claim 10, wherein the first illumination source or the second illumination source comprises a block of pixels on a face of the apparatus.

13. The method of claim 10, wherein the first threshold level comprises a particular level of ambient infrared light within a range of 5% to 20% of a level of radiant infrared light from sunlight at the sun's zenith and for a mean Earth-sun separation.

14. The method of claim 10, further comprising:
tracking one or more eyes of the particular user, by eye tracking circuitry, based on performing the pupil identification; and
performing user sentiment analysis, by sentiment analysis circuitry, based on the tracking of the one or more eyes of the user.

15. A non-transitory computer-readable storage medium for using an apparatus to perform pupil identification, the non-transitory computer-readable storage medium storing computer-executable program code instructions that, when executed, cause the apparatus to:
determine, using toggling circuitry, based on a measured ambient infrared light level exceeding a first threshold or failing to meet a second threshold, whether to perform pupil identification using one of either the dark pupil identification process or the bright pupil identification process;
perform, using pupil identification circuitry, pupil identification on a user using the bright identification process upon the determination that the measured ambient infrared light level exceeds the first threshold; and
perform, using pupil identification circuitry, pupil identification on a user using dark pupil identification process upon the determination that the measured ambient infrared light level fails to meet the second threshold.

16. The non-transitory computer-readable storage medium of claim 15, wherein the computer-executable program code instructions further comprise instructions that, when executed, cause the apparatus to:
measure, using a light sensor, an ambient infrared light level.

17. The non-transitory computer-readable storage medium of claim 15,
wherein the pupil identification circuitry comprises dark pupil identification circuitry and bright pupil identification circuitry,
wherein the bright pupil identification circuitry is configured to perform the bright pupil identification process using a first illumination source of the apparatus, and
wherein the dark pupil identification circuitry is configured to perform the dark pupil identification process using a second illumination source of the apparatus.

18. The non-transitory computer-readable storage medium of claim 17, wherein the first illumination source or the second illumination source comprises an infrared illuminator.

19. The non-transitory computer-readable storage medium of claim 17, wherein the first illumination source or the second illumination source comprises a block of pixels on a face of the apparatus.

20. The non-transitory computer-readable storage medium of claim 15, wherein the first threshold level comprises a particular level of ambient infrared light within a range of 5% to 20% of a level of radiant infrared light produced by sunlight at the Sun's zenith and for a mean Earth-Sun separation.

21. The non-transitory computer-readable storage medium of claim 15, wherein the computer-executable program code instructions further comprise instructions that, when executed, cause the apparatus to:
track one or more eyes of the particular user, using eye tracking circuitry, based on performing the pupil identification; and
perform user sentiment analysis, using sentiment analysis circuitry, based on the tracking of the one or more eyes of the user.

* * * * *